Patented Oct. 4, 1949

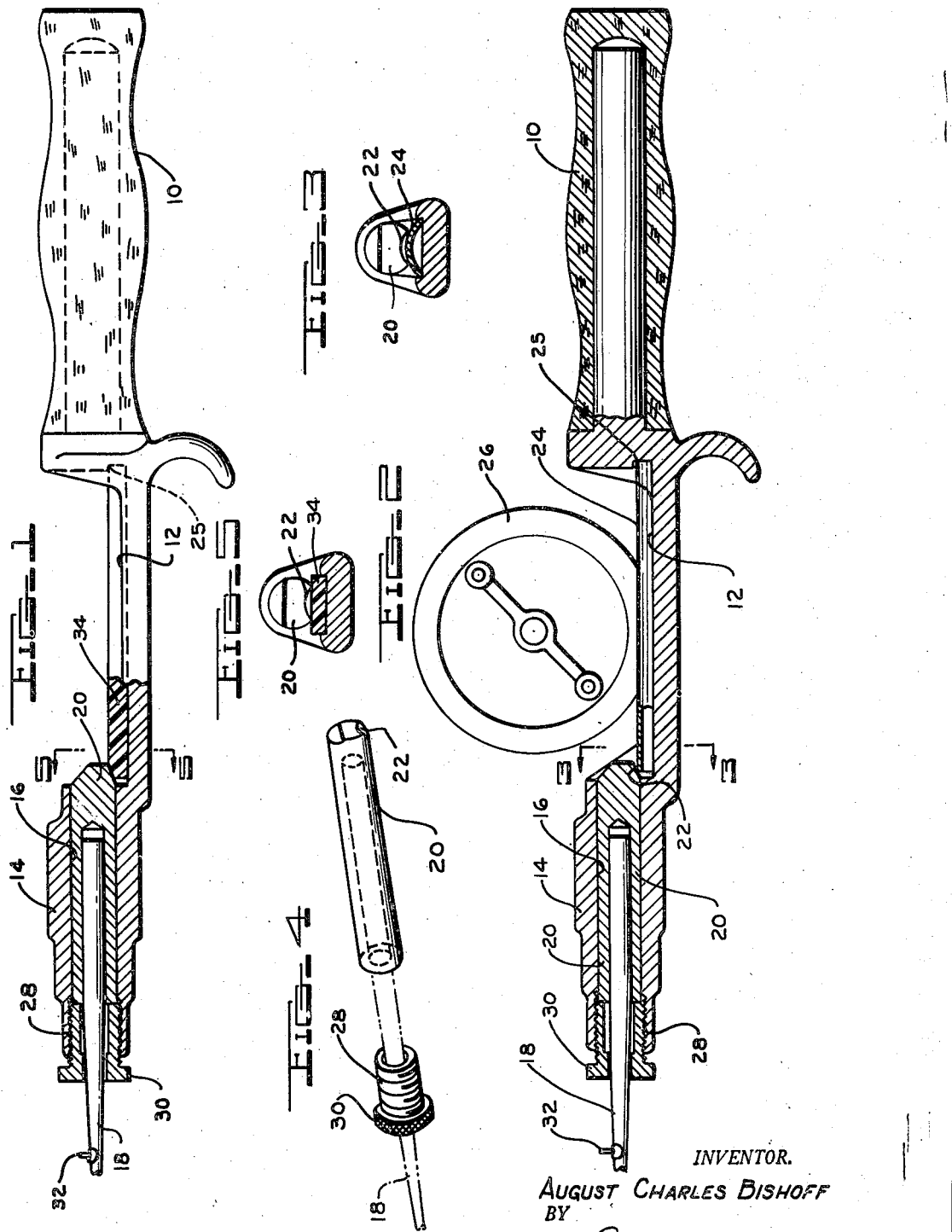

2,483,519

UNITED STATES PATENT OFFICE 2,483,519

FISHING ROD AND HANDLE ASSEMBLY

August Charles Bishoff, Detroit, Mich.

Application April 12, 1946, Serial No. 661,855

5 Claims. (Cl. 43—22)

This invention relates to improvements in fishing rods.

An object is to provide an improved fishing rod structure which includes a rod portion and a handle portion adapted to be so assembled together that the handle portion may have a reel attached thereto and held in place thereon without the employment of means other than that employed to secure the rod to the handle, and the construction is such that when the reel and rod are secured to the handle the rod is properly aligned upon the handle with respect to the reel.

Another object is to provide a fishing rod assembly including a handle portion and a rod structure so constructed that the handle and rod may be easily assembled or disassembled and a reel structure may be secured to the handle and held in place thereon without the employment of additional securing means other than that employed to secure the handle thereto. Furthermore, the construction is such that the securement of the rod and reel to the handle operates to rotatably adjust the rod to properly align the same with the reel when the reel is mounted on the handle.

Another object is to provide a fishing rod assembly of the character described wherein the handle is provided with a depressed reel seat upon which the base of a conventional fishing reel is adapted to be mounted. The handle is also provided with a socket or barrel passageway extending forwardly from the reel seat and adapted to receive the rear end portion of a fishing rod. Means is provided to secure the fishing rod to the handle and this means functions to urge the rod inwardly through the socket in the handle to overhang the reel seat and to engage the base of the reel to hold the reel in place upon the seat and at the same time to properly position the rod with respect to the reel.

The arrangement of the assembly is such that the end of the rod which is rotatably slidable through the socket in the handle is shaped to cooperate with the end of the base of a reel seated upon the reel seat to interlock therewith and locate the rod in proper alignment with the reel when the rod and reel are locked to the handle. The construction shown herein is an improvement upon the construction shown in my application Serial No. 605,232, filed July 16, 1945.

Other objects, advantages and meritorious features will more fully appear from the following description, appended claims and accompanying drawing wherein:

Figure 1 is a side elevation of a fishing rod handle and rod assembly, partly broken away, embodying my invention, Figure 2 is a longitudinal sectional view through a fishing rod handle, rod and reel assembly, embodying my invention, Figure 3 is a vertical sectional view taken on the line 3—3 of Figure 2, Figure 4 is a perspective of a fragment of the rear end of a fishing rod and handle attachment therefor, and Figure 5 is a cross sectional view taken on line 5—5 of Figure 1.

The invention relates to mechanism which is associated with a fishing rod and its handle and and reel and is adapted to be employed to releasably simultaneously secure the rod and the reel to the handle and to locate the rod with respect to the reel and the handle. In the drawings the handle is shown as provided with a hand grip portion 10, a depressed reel seat portion 12 and a forwardly extending barrel or socket portion 14. This barrel portion is cored out to provide the socket or barrel passageway 16 which extends therethrough and opens through the forward end into the reel seat portion of the handle. The barrel or socket portion of the handle is adapted to receive the enlarged rear end 20 of a fishing rod 18 to be secured therein to assemble the rod upon the handle. In the drawing the fishing rod proper is indicated as 18. Secured to the rear end of this rod is an enlarged end or plunger portion 20 securely fastened to the rod 18 by brazing, soldering or the like.

This plunger is shown as of cylindrical form. It is freely slidable through the socket passageway 16. It is also rotatable within such socket opening. The rear end of the plunger 20 is provided with an arcuate recesse 22. This recess is shaped to conform with the upwardly convex base 24 of a fishing reel 26 for a purpose hereinafter set forth.

A threaded cap or nut 28 is provided. This cap is externally threaded to be received within the outer threaded end of the socket passageway 16 and this cap has a knurled thumb grip portion 30. The cap is freely slidable over the rod 18. When the end 20 of the rod 18 is received within the socket of the handle the cap can be threaded into the threaded entrance to the socket opening. As the cap engages the end of the enlarged portion 20 of the rod it urges the rod inwardly as shown in Figure 2 so that the rear end of the enlarged portion 20 overhangs the reel seat 12 of the handle. A common type of reel base is one which is upwardly convex as shown in Figures 2 and 3. When the rod is urged to the position shown in Figure 2 the arcuate recess 22 formed on the rear end of the enlarged portion 20 is adapted to engage the upwardly convex face of the base of the reel as shown in Figures 2 and 3. This holds the reel securely in place because it will be noted that the rear end of such base is received within an undercut 25 of the handle.

Due to the fact that the recess 22 on the rear end of the enlarged portion 20 of the handle is arcuate in shape, it will be seen that when this recess engages the upwardly convex face of the reel base as shown in Figure 3 it will position the rod in alignment with the reel. If the rod were inserted so that only one corner of the arcuate recess engaged the upwardly convex surface of the base 24, the rod being slightly out of alignment, the tightening down of the nut 28 would cause the rod to rotate about its axis within the handle and line up with the reel. The line guides 32 are of course aligned and oppositely disposed with respect to the arcuate recess 22 so that the rod will be positioned to bring such line guides in proper position for the line from the reel to pass freely therethrough.

It is apparent, therefore, that not only is the construction such that the reel and rod are simultaneously locked to the handle but the rod is also correctly aligned with the reel when it is so locked with the handle.

In order that the pole 18 and handle may be secured together in the absence of a reel the plate 34 may be seated on the reel base and the plunger 20 tightened back thereagainst as shown in Figs. 1 and 5.

What I claim is:

1. In combination, a fishing rod, a handle for the rod, said handle having a reel seat, and a reel having a base plate receivable upon said reel seat, said handle having a socket passageway extending from the reel seat through a portion of the handle forwardly of the reel seat, said rod having a rear end portion rotatable and slidable through the socket passageway to project therebeyond and overhang the reel seat, and said base plate and rear end portion of the rod shaped to cooperatively engage each other to rotatably position the rod within the socket passageway when the rear end of the rod is cooperatively engaged with the reel base plate.

2. In combination, a fishing rod, a handle, said handle provided intermediate its ends with a depressed reel seat and provided with a rod receiving socket extending forwardly from the reel seat through the handle, a plate mounted upon the reel seat, said plate having an upwardly convex face, said rod having a rear end portion receivable within the socket and rotatable therein, said rear end portion provided with an upwardly concave recess adapted to engage the upwardly convex face of the plate to position the rod rotatably within the socket and definitely with respect to the plate and means coupled with the handle and with the rod operable to hold the rod within the socket with the recess in the end of the rod engaged with the convex face of the plate.

3. In combination, a fishing rod, a handle having a reel seat and provided with a socket adapted to receive the end of the rod, a plunger part coupled with the rod and receivable through the socket, and means slidable over the rod and adjustably engaged within the socket and operable to urge said plunger part to project beyond the socket and overhang the reel seat to lock a reel base thereon, said reel base and plunger part each provided with inter-engaging parts adapted to cooperatively engage each other to rotatably position the rod with respect to the reel base when the plunger part is urged against the reel base.

4. A fishing rod assembly comprising a handle having a reel seat and provided with a socket portion extending forwardly therefrom, a rod having an end portion receivable within the socket, means coupled with the rod and adjustably threaded into the socket, said means adapted to urge the end portion of the rod to project rearwardly from the socket over the reel seat to engage a reel base mounted upon the seat to releasably secure the reel thereto, and a reel having a base adapted to rest upon said reel seat, said reel base and end portion of the rod provided with interlocking parts adapted to cooperatively engage each other to position the rod rotatably with respect to the reel when the end portion of the rod is urged into engagement with the base.

5. In combination, a fishing rod, a handle, said handle provided intermediate its ends with a depressed reel seat having an undercut at one end, said handle having a rod receiving socket extending forwardly from the opposite end of the reel seat, the rear end portion of the rod being receivable rotatably and slidably within said socket, said rear end portion of the rod exhibiting an arcuate beveled recess on its rear end, and a nut slidable over the rod and threadedly engageable within the socket and having a part adapted to abut a cooperating part on the rod to urge the rear end of the rod beyond the socket to overhang the reel seat, said reel having a base adapted to rest upon the reel seat of the handle, and said base being upwardly convex to be cooperatively engaged within the arcuate recess in the end of the rod to lock the reel to the handle and to line up the rod with the reel.

AUGUST CHARLES BISHOFF.

REFERENCES CITED

The following references are of record in the file of this patent:

UNITED STATES PATENTS

| Number | Name | Date |
| --- | --- | --- |
| 1,591,122 | Gephart | July 6, 1926 |
| 1,920,966 | Carlson | Aug. 8, 1933 |
| 2,421,240 | Gamburn | May 27, 1947 |